United States Patent [19]
Valentine

[11] Patent Number: 6,081,510
[45] Date of Patent: Jun. 27, 2000

[54] METHOD AND APPARATUS FOR ROBUST OPERATION OF DATA TRANSMISSION DURING ADVERSE RADIO-LINK CONDITIONS

[75] Inventor: Matthew F. Valentine, Palatine, Ill.

[73] Assignee: Motorola, Inc., Schaumburg, Ill.

[21] Appl. No.: 09/136,242

[22] Filed: Aug. 19, 1998

[51] Int. Cl.[7] ..................................................... H04J 1/16
[52] U.S. Cl. ........................... 370/252; 370/332; 375/222
[58] Field of Search ...................... 370/248, 252, 370/329, 331, 332, 333, 328; 455/67.1, 436, 437, 438, 439; 375/222

[56] References Cited

U.S. PATENT DOCUMENTS

| 5,278,866 | 1/1994 | Nonami | 375/227 |
|---|---|---|---|
| 5,381,443 | 1/1995 | Borth et al. | 375/202 |
| 5,524,122 | 6/1996 | Lepitre et al. | 375/222 |
| 5,612,960 | 3/1997 | Stevens et al. | 714/712 |
| 5,764,699 | 6/1998 | Needham et al. | 375/261 |
| 5,793,843 | 8/1998 | Morris | 455/422 |
| 5,873,035 | 2/1999 | Ladden et al. | 455/436 |

*Primary Examiner*—Chau Nguyen
*Assistant Examiner*—Soon-Dong Hyun
*Attorney, Agent, or Firm*—Kenneth A. Haas

[57] ABSTRACT

A method and apparatus for robust operation of data transmission during adverse radio-link conditions is provided herein. Prior to adverse radio-link conditions existing, a far-end modem (101) is notified that such adverse conditions are imminent. The far-end modem (101) stores the current operating parameters, temporarily ceases data transmission, and begins operating in a more robust mode. Once radio-link conditions are again favorable, the far-end modem (101) reverts back to the stored operating parameters and data transmission resumes.

14 Claims, 4 Drawing Sheets

METHOD AND APPARATUS FOR ROBUST OPERATION OF DATA TRANSMISSION DURING ADVERSE RADIO-LINK CONDITIONS

FIELD OF THE INVENTION

The present invention relates generally to cellular communication systems and, in particular, to data transmission within such cellular communication systems.

BACKGROUND OF THE INVENTION

Communication systems are well known and consist of many types including land mobile radio, cellular radiotelephone, personal communication systems, and other communication system types. Within a communication system, transmissions are conducted between a transmitting device and a receiving device over a communication resource, commonly referred to as a communication channel. To date, the transmissions have typically consisted of voice signals. More recently however, it has been proposed to carry other forms of signals, including data signals. For ease of operation, it is preferable to have the data transmission capability overlay the existing voice communication capability, such that its operation is essentially transparent to the voice communication system while still utilizing the communication resources and other infrastructure of the voice communication system.

In cellular communication systems remote units typically transfer communications between base stations. More particularly, as a remote unit moves to the periphery of a serving base station's coverage area, a handoff is made to a base station that can better serve the remote unit. In addition to transferring communication from one base station to another, often times the handoff between base stations also requires a transferring of communications between two Centralized Base Station Controllers (CBSCs). Currently, such inter-CBSC (hard) handoff results in an adverse radio-link condition where the channel is lost for a short period of time. For a typical "voice" call, the callers perceive the lost channel as a brief muting of their conversation, however, for data transmissions the lost channel may result in the data transmission being aborted, or at a minimum, the retraining of modems to re-establish communication (which can take up to 20 seconds). Therefore, a need exists for a method and apparatus for data transmission within a communication system during adverse radio-link conditions that allows for data transmission without the above-mentioned problems existing with prior-art data transmission schemes.

DETAILED DESCRIPTION OF THE DRAWINGS

To address the need for data transmission, a method and apparatus for robust operation of data transmission during adverse radio-link conditions is provided herein. Prior to adverse radio-link conditions existing, a far-end modem is notified that such adverse conditions are occurring or are imminent. The far-end modem stores the current operating parameters, temporarily ceases data transmission, and begins operating in a more robust mode. Once radio-ink conditions are again favorable, the far-end modem reverts back to the stored operating parameters and data transmission resumes.

The present invention encompasses a method and apparatus for robust operation of data transmission during adverse radio-link conditions. In a first embodiment, the method comprises the steps of operating a modem with a first set of parameters, receiving a notification that adverse radio-link conditions are occurring or are imminent, and operating the modem with a second, more robust set of parameters based on the notification.

In an alternate embodiment the method comprises the steps of operating a modem with a first set of parameters, and receiving a first notification that a handoff is occurring or is imminent. The first set of parameters are then stored and the modem is then operated with a second, more robust set of parameters in response to the notification.

In yet an alternate embodiment the method comprises the steps of determining that adverse radio-link conditions are occurring or are imminent and sending a message to a far-end modem in response to the determination. In the preferred embodiment of the present invention the message causes the far end modem to operate in a more robust mode of operation during the adverse radio-link conditions.

The apparatus comprises a controller for determining that adverse radio-link conditions are occurring or are imminent and sending a message to a far-end modem in response to the determination, wherein the message causes the far end modem to operate in a more robust mode of operation during the adverse radio-link conditions.

In an alternate embodiment the apparatus comprises a parameter database having first modem parameters as an input for temporarily storing the first modem parameters during adverse radio-link conditions, and a robust parameter database for providing robust modem parameters to modem circuitry during the adverse radio-link conditions.

Figure 1:
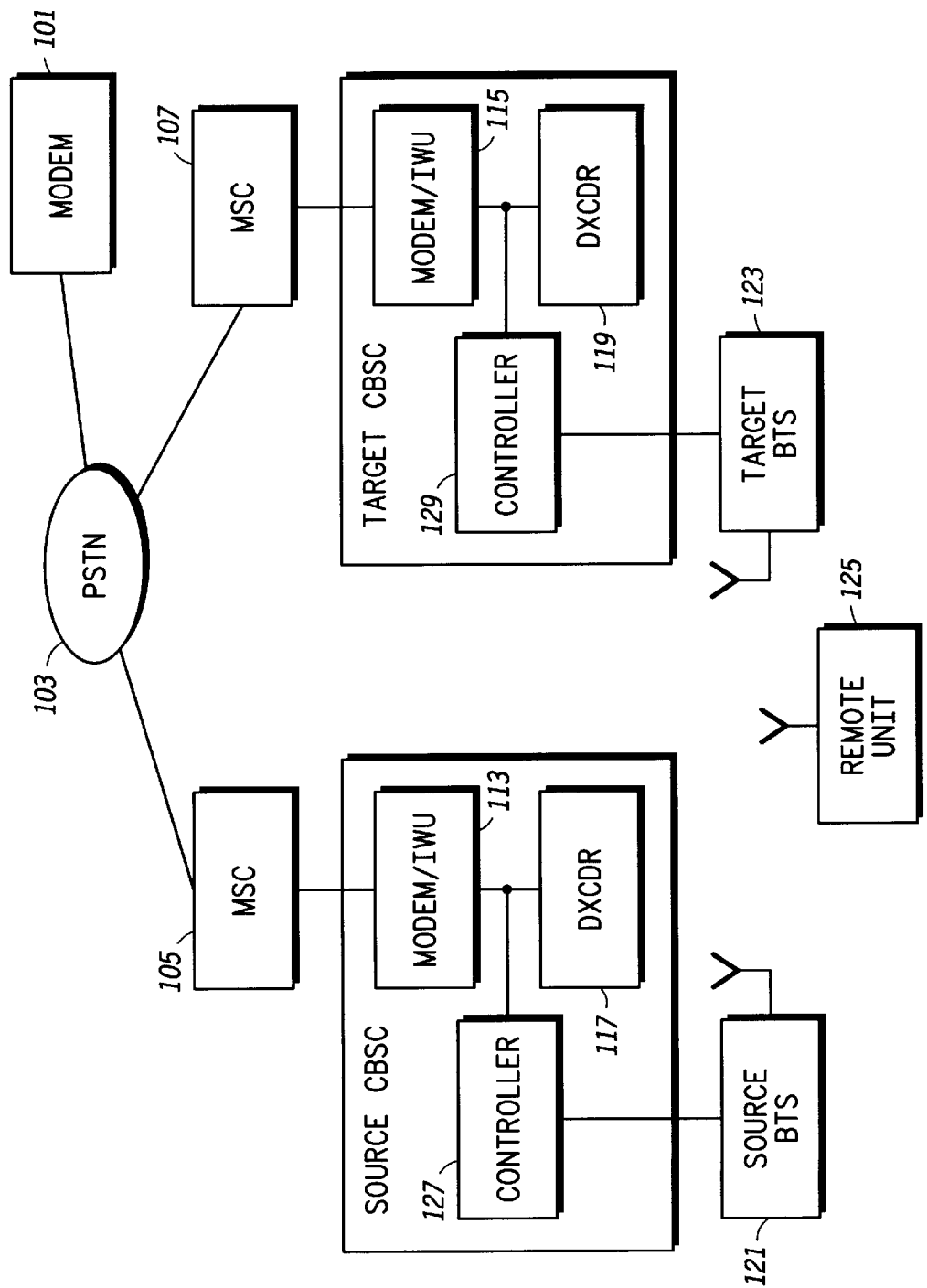
FIG. 1 is a block diagram of a communication system in accordance with the preferred embodiment of the present invention.

Turning now to the drawings, wherein like numerals designate like components, FIG. 1 is a block diagram of communication system 100 in accordance with the preferred embodiment of the present invention. In the preferred embodiment of the present invention, communication system 100 utilizes a Code Division Multiple Access (CDMA) system protocol as described in "Personal Station-Base Station Compatibility Requirements for 1.8 to 2.0 GHz Code Division Multiple Access (CDMA) Personal Communication Systems" (American National Standards Institute (ANSI) J-STD-008), but in alternate embodiments communication system 100 may utilize other analog or digital cellular communication system protocols such as, but not limited to, the Narrowband Advanced Mobile Phone Service (NAMPS) protocol, the Advanced Mobile Phone Service (AMPS) protocol, the Global System for Mobile Communications (GSM) protocol, the Personal Digital Cellular (PDC) protocol, or the United States Digital Cellular (USDC) protocol. Communication system 100 includes source Base Transceiver Station (BTS) 121, target BTS 123, remote unit 125, source Centralized Base Station Controller (CBSC) 109, target CBSC 111, Mobile Switching Centers (MSCs) 105 and 107, Public Switched Telephone Network (PSTN) 103, and far-end modem 101.

The preferred embodiment will be described below with regards to an adverse radio-link condition resulting from a hard handoff, although an adverse radio-link condition may result from other system conditions as well (e.g., occurring or imminent high Frame Error Rate (FER), occurring or imminent low Signal-to-Noise Ratio (SNR), occurring or imminent poor received signal strength, occurring or imminent poor Bit Error Rate (BER), . . . , etc.). Additionally, although FIG. 1 shows far-end modem 101 as being connected directly to PSTN 103, in alternate embodiments of the present invention, far-end modem 101 may be connected to any landline, Local Area Network (LAN), Wide Area Network (WAN), or cellular network. Although not shown, far-end modem 101 is preferably coupled to an application such as a personal computer performing a file transfer and serves to convert the data flow between a digital format and an analog format suitable for transmission over PSTN 103.

Data transmission between far-end modem 101 and remote unit 125 occurs via remote unit 125 transmitting data through source BTS 121, source CBSC 109, MSC 105, PSTN 103, finally to far-end modem 101. As discussed above, as remote unit 125 approaches the edge of source BTS's 121 coverage area, a handoff is made to target BTS 123. Because source BTS 121 and target BTS 123 are coupled to different CBSCs (CBSC 109 and 111, respectively), a hard handoff will need to be made when transferring communication from BTS 121 to BTS 123. In contrast to a soft handoff, where simultaneous communication takes place between remote unit 125 and both BTSs 121 and 123, a hard handoff physically breaks communication with the source base station 121 when handing over communication to target base station 123.

In the preferred embodiment of the present invention, prior to adverse radio-link conditions existing (e.g., hard handoff being made), far-end modem 101 is notified that such adverse conditions are occurring or imminent, and stores the current operating parameters. Far-end modem 101 then temporarily ceases data transmission and begins operating in a more robust mode. Once radio-link conditions are again favorable (e.g., remote unit 125 is handed over to target BTS 123), far-end modem 101 reverts back to the stored operating parameters and data transmission resumes. More particularly, data transmission now occurs through target BTS123, target CBSC 111, MSC 107, PSTN 103, and finally to far-end modem 101. Because far-end modem 101 is placed in a robust mode prior to poor radio-link conditions existing, the probability that data transmission will be aborted is greatly reduced. Additionally, since far-end modem 101 is placed in a robust mode prior to poor radio-link conditions existing, the probability that far-end modem 101 will need to be retrained is greatly reduced.

Figure 2:
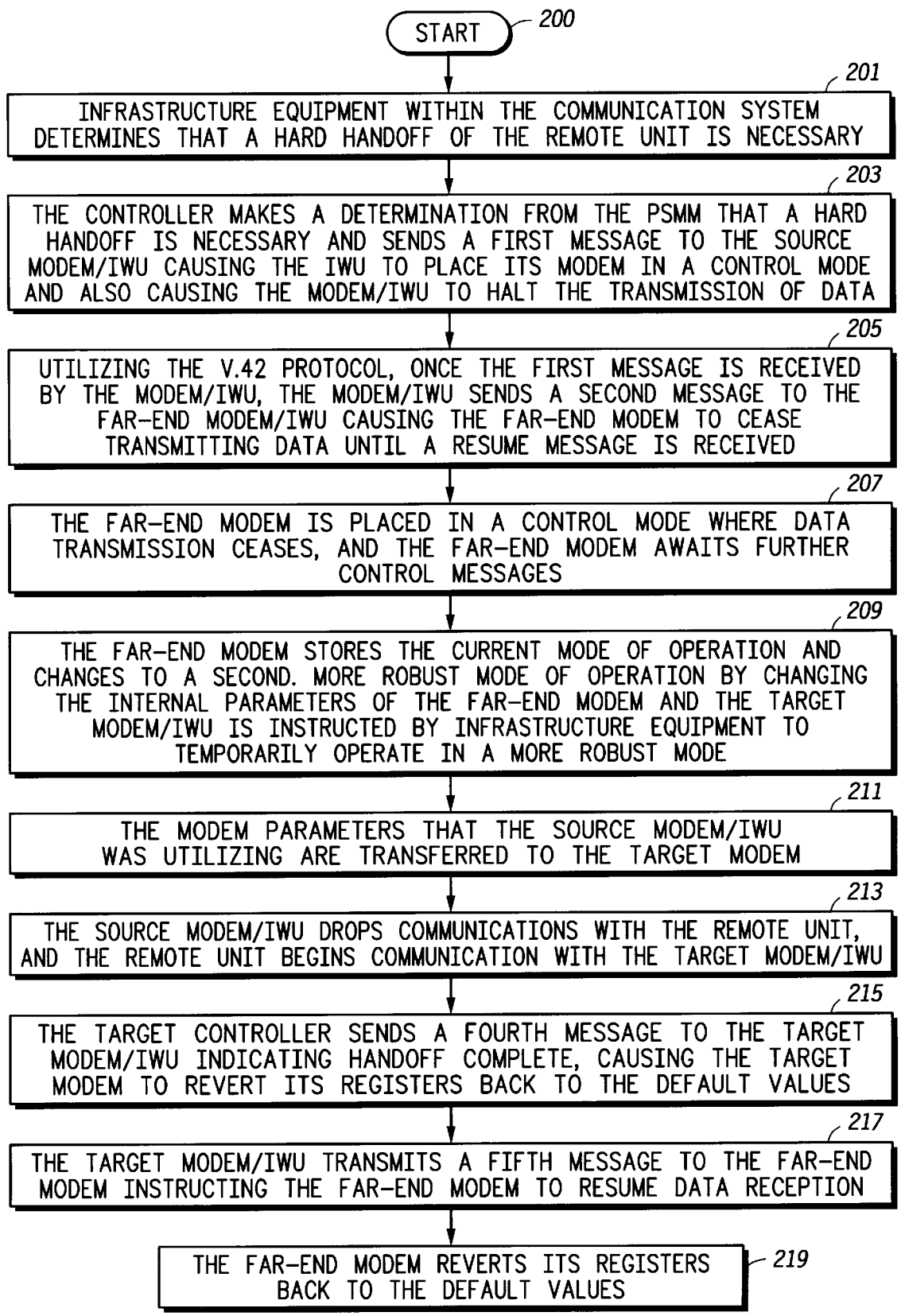
FIG. 2 is a flow chart showing preferred operation of the communication system of FIG. 1 during adverse radio-link conditions.

FIG. 2 is a flow chart illustrating operation of communication system 100 during adverse radio-link conditions in accordance with the preferred embodiment of the present invention. The logic flow begins at step 200 where far-end modem 101 is actively receiving data utilizing a first set of operating parameters. Next at step 201 infrastructure equipment within communication system 100 determines that adverse radio-link conditions are occurring or imminent (a hard handoff of remote unit 125 is occurring or imminent). In the preferred embodiment of the present invention the determination that a hard handoff is needed is made as described in J-STD-008, section 3.6.6 (Requirements for Base Station CDMA Operation) Handoff Procedures. As described in J-STD-008, remote unit 125 sends a Pilot Strength Measurement Message (PSMM) to source CBSC 109 via source BTS 121. The PSMM contains measurement reports for each surrounding base station. Controller 127 makes a determination from the PSMM that a hard handoff is necessary and at step 203 sends a first message (Hard Handoff Imminent Message) to source modem/IWU 113 causing IWU 113 to place its modem in a control mode and also causing source modem/IWU 113 to halt the transmission of data. In the preferred embodiment of the present invention the IWU injects the configurable modem escape sequence (normally a string of "+++" characters) into the modem's data input to halt data transmission.

Modems 101, 113, and 115 utilize an error correcting protocol as described in International Telecommunication Union-Telecommunication Standardization (ITU-T), V Series Recommendation V.42. Utilizing the V.42 error correcting protocol, once the Handoff Imminent Message is received by source modem/IWU 113, source modem/IWU 113 sends a second message to far-end modem 101 (step 205) indicating that adverse radio-link conditions are occurring or are imminent (e.g., a hard handoff is about to occur). The second message causes far-end modem 101 to cease receiving/transmitting data until a resume message is received. In the preferred embodiment of the present invention the second message is a Link Access Protocol for Modems-Unnumbered Information (LAPM UI) control-function to control-function frame with a Data Link Connection Identifier (DLCI) of 63 (as specified in V.42, Section 11, and Appendix V). The payload of this LAPM frame in step 205 is a control message which indicates that a handoff is imminent. Next, at step 207, far-end modem 101 is placed in a control mode where data transmission ceases, and far-end modem 101 awaits further control messages.

Upon receipt of the second message, far-end modem 101 stores the current mode of operation (internal parameters such as Carrier Loss Time, Carrier Detect Time, Data Inactivity Timer, Auto Retrain Mode), and changes to a second, more robust mode of operation by changing the internal parameters of far-end modem 101 (step 209). In the preferred embodiment of the present invention the following V.42 parameters are changed:

far-end modem 101 is set to ignore carrier loss for an indefinite amount of time by setting Carrier Loss Time register accordingly;

far-end modem 101 is set to detect a new carrier after the minimum configurable time of the presence of a new carrier (0.1 second in the preferred embodiment) by setting Carrier Detect Time register accordingly;

far-end modem 101 is set so that a Data Inactivity Timer will never expire, by setting Data Inactivity Timer accordingly; and far-end modem 101 is instructed to not retrain for bad telephone line conditions by setting Disable Auto Retrain accordingly.

Additionally, at step 209 target modem/IWU 115 is instructed by infrastructure equipment to temporarily operate in a more robust mode. In particular, target controller 129 first signals the target modem/IWU 115 to allocate channel resources. Next controller 129 signals target modem/IWU 115 with a third message (Handoff In Progress Message). When target modem/IWU 115 receives the third message, the IWU commands the modem's control function to store the current mode of operation (by saving parameters such as Auto Retrain Mode and V.42 Negotiation Action) and change to a second, more robust mode of operation by changing the internal parameters of the target modem. In the preferred embodiment of the present invention:

target modem 115 is instructed to not retrain for bad telephone line conditions by setting Disable Auto Retrain accordingly; and target modem 115 is set to disable detection and negotiation for V.42 and proceed directly to LAPM communication when a "handoff complete" message is received by setting V.42 Negotiation Action accordingly.

Continuing, at step 211 modem parameters that source modem/IWU 113 was utilizing for communication with remote unit 125 are transferred from source modem 113 to target modem 115. These parameters are transferred to target modem/IWU 115 as described in U.S. Pat. No. 5,873,035 (application Ser. No. 08/594,081) CONDUCTING HANDOFF OF A DATA TRANSMISSION by Ladden et al., and incorporated by reference herein. In the preferred embodiment of the present invention any combination of an equalization parameter, an echo canceller parameter, an originate/answer state parameter, an Attention (AT) command set-up parameter, a modem speed parameter, and a modem receive level parameter are transferred from source modem 113 to target modem 115. At step 213 source modem/IWU 113 drops communication with remote unit 125, and remote unit 125 begins communication with target modem/IWU 115. Next at step 214, the target controller 129 then sends a fourth message to target modem/IWU 115 indicating Handoff Complete, causing the target modem to revert its registers back to the default values. At step 215 target mode/IWU 115 transmits a fifth message to far-end modem 101 instructing far-end modem 101 to resume data reception. In the preferred embodiment of the present invention the fifth message comprises a V.42 LAPM control-function to control-function message, with DLCI of 63 as described above. The payload of this LAPM frame in step 215 is a control message which indicates Handoff Complete. At step 217 far-end modem 101 reverts its registers back to the default values (i.e., retrieves the stored set of parameters and reverts its registers to those stored parameters), and normal data transfer utilizing the stored parameters resumes between remote unit 125 and far-end modem 101.

As discussed above, because the far-end modem is placed in a robust mode prior to a hard handoff, the probability that data transmission will be aborted, or modem retraining will take place, is greatly reduced.

Figure 3:
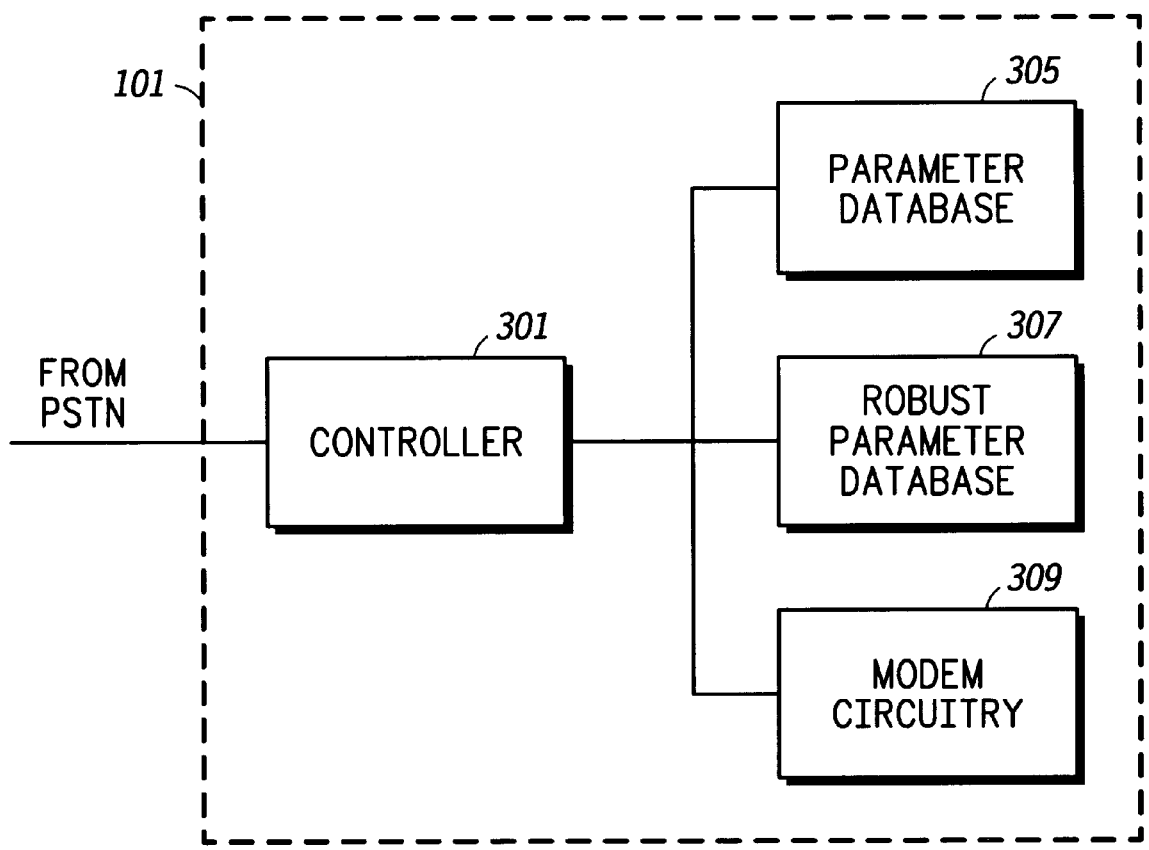
FIG. 3 is a block diagram of the far-end modem of FIG. 1 in accordance with the preferred embodiment of the present invention.
Figure 4:
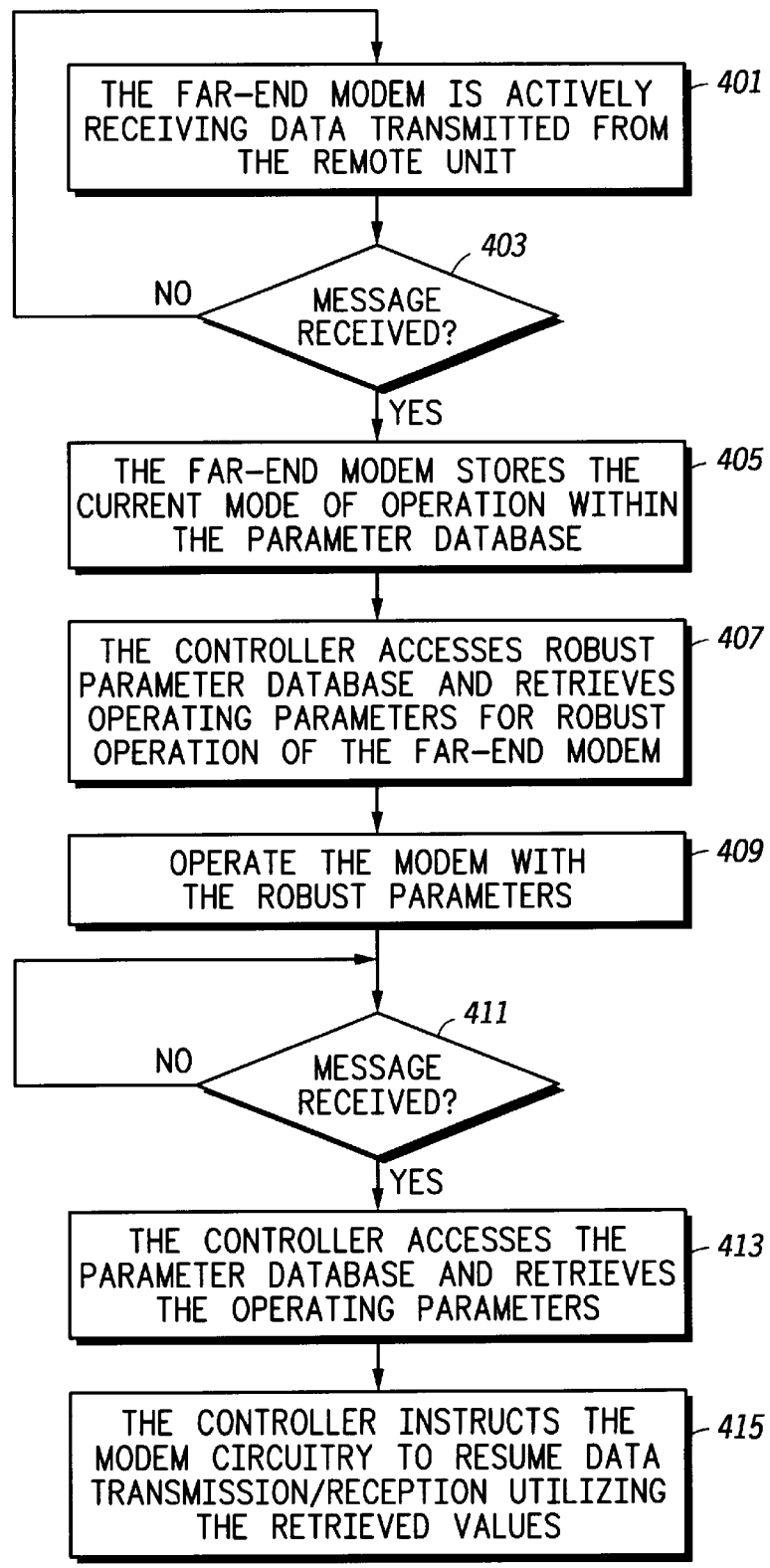
FIG. 4 is a flow chart showing operation of the far-end modem of FIG. 1 in accordance with the preferred embodiment of the present invention.

FIG. 3 is a block diagram of far-end modem 101 in accordance with the preferred embodiment of the present invention. Far-end modem 101 comprises controller 301, parameter database 305, robust parameter database 307, and modem circuitry 309. In the preferred embodiment of the present invention normal modem operations occur via controller 301 and modem circuitry 309. Additionally, in the preferred embodiment of the present invention modem circuitry 309 is standard modem circuitry that operates utilizing the V.42 modem protocol as described above. Operation of far-end modem 101 in accordance with the preferred embodiment of the present invention occurs as described in FIG. 4. The logic flow begins at step 401 where far-end modem 101 is actively receiving data transmitted from remote unit 125 utilizing a first mode of operation (first set of operating parameters). Next, at step 403, controller 301 determines if a message is received requesting far-end modem 101 to cease data transmission. As discussed above, controller 301 determines if an LAPM UI message is received, indicating that poor radio-link conditions are either occurring, or imminent. If at step 403 the message is not received, the logic flow returns to step 401, otherwise the logic flow continues to step 405. At step 405 far-end modem 101 stores the current mode of operation within parameter database 305. More particularly, controller 301 determines the current operating parameters (e.g., the current parameters for Carrier Loss Time, Carrier Detect Time, Data Inactivity Timer, Auto Retrain Mode) and then stores these parameters in parameter database. Next, at step 407 controller 301 accesses robust parameter database 307 and retrieves operating parameters for robust operation of far-end modem 101. More particularly, Carrier Loss Time, Carrier Detect Time, Data Inactivity Timer, and Auto Retrain Mode are retrieved from database 307 (step 407) and modem circuitry 309 is made to operate with the above parameters (step 409). At step 411 controller 301 determines if a message instructing far-end modem 101 to resume data reception has been received, and if not the logic flow returns to step 411. If at step 411 a message instructing far-end modem 101 to resume data reception is received, then the logic flow continues to step 413 where controller accesses parameter database 305 and retrieves the operating parameters (values for Carrier Loss Time, Carrier Detect Time, Data Inactivity Timer, Auto Retrain Mode), and at step 415 instructs modem circuitry 309 to resume data transmission/reception utilizing the retrieved values.

The descriptions of the invention, the specific details, and the drawings mentioned above, are not meant to limit the scope of the present invention. For example, in an alternate embodiment, modems connected to, or existing in remote units may similarly be placed in a more robust mode during adverse radio-link conditions. In this particular embodiment, remote unit 125, having an internal modem (not shown) becomes aware of an occurring or imminent poor link condition, and places its modem into control mode and signals to its modem, Handoff Imminent. The remote unit's modem can then send a LAPM UI control-to-control frame with DLCI 63 to the far-end modem 101 indicating Handoff Imminent, and both enter a more robust mode as described in the preferred embodiment. With varying configurations, this alternate embodiment also allows for the handoff of a remote-unit/modem combination from a radio-link to a landline, landline to radio-link, or between any physical layers, as any such handoff can create adverse radio-link or physical layer conditions. It is the intent of the inventors that such modifications can be made to the present invention without varying from the spirit and scope of the invention, and it is intended that all such modifications come within the scope of the following claims and their equivalents.

What is claimed is:

1. A method for robust operation of data transmission during adverse radio-link conditions, the method comprising the steps of:

operating a modem with a first set of parameters;

receiving a first notification that adverse radio-link conditions are occurring or are imminent; and operating the modem with a second, more robust set of parameters based on the first notification wherein the step of operating the modem with the second, more robust set of parameters comprises the step of instructing the modem to ignore a carrier loss, instructing the modem to detect a new carrier in the minimum configurable period of time after the presence of the new carrier, instructing the modem to not allow a data inactivity timer to expire, or instructing the modem to not retrain for a bad telephone line condition.

2. The method of claim 1 further comprising the steps of:

storing the first set of parameters;

receiving a second notification that adverse radio-link conditions have ceased;

retrieving the stored first set of parameters based on the second notification; and again operating the modem with the first set of parameters in response to the second notification.

3. The method of claim 1 wherein the step of operating the modem comprises the step of receiving data via the modem, wherein the data was transmitted utilizing a cellular communication system.

4. The method of claim 1 wherein the step of receiving the first notification comprises the step of receiving a notification that a handoff is imminent.

5. The method of claim 1 wherein the step of operating the modem with the second, more robust set of parameters comprises the steps of:

temporarily ceasing data transmission; and operating the modem operating with the second, more robust set of parameters based on the first notification.

6. A method for robust operation of data transmission in a cellular communication system during handoff, the method comprising the steps of:

operating a modem with a first set of parameters;

receiving a first notification that a handoff is occurring or is imminent;

storing the first set of parameters;

operating the modem with a second, more robust set of parameters based on the first notification;

receiving a second notification that the handoff is complete;

retrieving the stored set of parameters based on the second notification; and again operating the modem with the first set of parameters.

7. The method of claim 6 wherein the step of operating the modem with the second, more robust set of parameters comprises the steps of:

temporarily ceasing data reception; and operating the modem with the second, more robust set of parameters based on the first notification.

8. The method of claim 6 wherein the step of operating the modem with the second, more robust set of parameters comprises the step of instructing the modem to ignore a carrier loss, instructing the modem to detect a new carrier in the minimum configurable period of time after the presence of the new carrier, instructing the modem to not allow a data inactivity timer to expire, or instructing the modem to not retrain for a bad telephone line condition.

9. A method for robust operation of data transmission during adverse radio-link conditions, the method comprising the steps of:

determining that adverse radio-link conditions are occurring or are imminent; and sending a message to a far-end modem in response to the determination, wherein the message causes the far end modem to operate in a more robust mode of operation during the adverse radio-link conditions, wherein the more robust set of parameters comprises parameters taken from the group consisting of instructing the modem to ignore a carrier loss, instructing the modem to detect a new carrier for less than a period of time of the presence of the new carrier, instructing the modem to not allow a data inactivity timer to expire, and instructing the modem to not retrain for a bad telephone line condition.

10. The method of claim 9 wherein the step of determining that adverse radio-link conditions are occurring or are imminent comprises the step of determining that a hard handoff is occurring or imminent.

11. An apparatus for robust operation of data transmission during adverse radio-link conditions, the apparatus comprising a controller for determining that adverse radio-link conditions are occurring or are imminent and sending a message to a far-end modem in response to the determination, wherein the message causes the far end modem to operate in a more robust mode of operation during the adverse radio-link conditions, wherein the more robust set of parameters comprises parameters taken from the group consisting of instructing the modem to ignore a carrier loss, instructing the modem to detect a new carrier for less than a period of time of the presence of the new carrier, instructing the modem to not allow a data inactivity timer to expire, and instructing the modem to not retrain for a bad telephone line condition.

12. The apparatus of claim 11 wherein the determination that adverse radio-link conditions are occurring or are imminent comprises a determination that a hard handoff is occurring or imminent.

13. An apparatus for robust operation of data transmission during adverse radio-link conditions, the apparatus comprising:

a parameter database having first modem parameters as an input for temporarily storing the first modem parameters during adverse radio-link conditions; and a robust parameter database for providing robust modem parameters to modem circuitry during the adverse radio-link conditions, wherein the more robust set of parameters comprises parameters taken from the group consisting of instructing the modem to ignore a carrier loss, instructing the modem to detect a new carrier for less than a period of time of the presence of the new carrier, instructing the modem to not allow a data inactivity timer to expire, and instructing the modem to not retrain for a bad telephone line condition.

14. The apparatus of claim 13 further comprising modem circuitry for receiving data utilizing the first modem parameters during non adverse radio-link conditions, and utilizing the robust modem parameters during adverse radio-link conditions.

* * * * *